United States Patent
Bladel et al.

(10) Patent No.: US 8,522,147 B2
(45) Date of Patent: *Aug. 27, 2013

(54) METHODS FOR VERIFYING PERSON'S IDENTITY THROUGH PERSON'S SOCIAL CIRCLE USING PERSON'S PHOTOGRAPH

(75) Inventors: James M. Bladel, Le Claire, IA (US); Yong Lee, Chandler, AZ (US); Noah D. Plumb, Phoenix, AZ (US); Wayne Thayer, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 231 days.

This patent is subject to a terminal disclaimer.

(21) Appl. No.: 13/237,876

(22) Filed: Sep. 20, 2011

(65) Prior Publication Data
US 2013/0073974 A1 Mar. 21, 2013

(51) Int. Cl.
*G06F 3/00* (2006.01)
*H04M 1/66* (2006.01)

(52) U.S. Cl.
USPC .................. 715/739; 715/210; 455/410

(58) Field of Classification Search
USPC ......... 382/100, 103, 112–118, 106, 132–139, 382/155, 162, 168, 181, 190, 209, 219, 232, 382/254, 274, 276, 291, 305, 220, 312; 705/5; 455/414.2, 556.1; 713/186; 715/739, 210
See application file for complete search history.

(56) References Cited

U.S. PATENT DOCUMENTS

| | | | |
|---|---|---|---|
| 5,426,594 A | 6/1995 | Wright et al. | |
| 5,771,354 A | 6/1998 | Crawford | |
| 5,774,660 A | 6/1998 | Brendel et al. | |
| 5,796,393 A | 8/1998 | MacNaughton et al. | |
| 5,872,848 A | 2/1999 | Romeny et al. | |
| 5,901,228 A | 5/1999 | Crawford | |
| 6,003,030 A | 12/1999 | Kenner et al. | |
| 6,085,242 A | 7/2000 | Chandra | |
| 6,151,631 A | 11/2000 | Ansell et al. | |
| 6,263,447 B1 | 7/2001 | French et al. | |
| 6,393,482 B1 | 5/2002 | Rai et al. | |
| 6,400,722 B1 | 6/2002 | Chuah et al. | |
| 6,411,943 B1 | 6/2002 | Crawford | |
| 6,598,077 B2 | 7/2003 | Primak et al. | |
| 6,625,643 B1 | 9/2003 | Colby et al. | |
| 6,629,136 B1 | 9/2003 | Naidoo | |
| 6,675,208 B1 | 1/2004 | Rai et al. | |
| 6,725,269 B1 | 4/2004 | Megiddo et al. | |
| 6,745,196 B1 | 6/2004 | Colyer et al. | |
| 6,757,740 B1 | 6/2004 | Parekh et al. | |

(Continued)

OTHER PUBLICATIONS

WiredAlumni.com, Jun. 1, 2000.

(Continued)

*Primary Examiner* — Seyed Azarian
(74) *Attorney, Agent, or Firm* — Stewart J. Womack

(57) ABSTRACT

One embodiment of a method of the present invention provides for obtaining an image from a requester, obtaining contact information for vouching people, whom requester identifies as having personal knowledge of the requester, and sending an electronic message to the vouching people, with a link to an image lineup. The image lineup contains the image obtained from the requester and other images. Then receiving a selection choice from the vouching people, identifying whether the image in the image lineup depicts the requester, and calculating a statistical rating of a likelihood that the image obtained from the requester depicts him/her.

28 Claims, 5 Drawing Sheets

(56) References Cited

U.S. PATENT DOCUMENTS

| | | |
|---|---|---|
| 6,829,230 B1 | 12/2004 | Tiuri |
| 6,996,609 B2 | 2/2006 | Hickman et al. |
| 7,047,202 B2 | 5/2006 | Jaipuria et al. |
| 7,080,051 B1 | 7/2006 | Crawford |
| 7,111,072 B1 | 9/2006 | Matthews et al. |
| 7,117,254 B2 | 10/2006 | Lunt et al. |
| 7,117,504 B2 | 10/2006 | Smith et al. |
| 7,139,840 B1 | 11/2006 | O'Toole |
| 7,149,892 B2 | 12/2006 | Freed et al. |
| 7,225,248 B1 | 5/2007 | Osburn, III |
| 7,233,978 B2 | 6/2007 | Overton et al. |
| 7,337,172 B2 | 2/2008 | Shapiro |
| 7,356,837 B2 | 4/2008 | Asghari-Kamrani et al. |
| 7,359,935 B1 | 4/2008 | Karipides et al. |
| 7,369,996 B2 | 5/2008 | Sladden |
| 7,373,500 B2 | 5/2008 | Ramelson et al. |
| 7,392,321 B1 | 6/2008 | Wolf et al. |
| 7,433,710 B2 * | 10/2008 | Bodnar et al. ............ 455/556.1 |
| 7,506,010 B2 | 3/2009 | Kulkarni et al. |
| 7,523,310 B2 | 4/2009 | Narin et al. |
| 7,590,073 B2 | 9/2009 | Beckmann et al. |
| 7,599,847 B2 * | 10/2009 | Block et al. ..................... 705/5 |
| 7,644,117 B2 | 1/2010 | Zimmerman et al. |
| 7,649,854 B2 | 1/2010 | Piper |
| 7,752,251 B1 | 7/2010 | Shuster et al. |
| 7,783,540 B2 | 8/2010 | Davis et al. |
| 7,797,413 B2 | 9/2010 | Adelman et al. |
| 7,804,982 B2 * | 9/2010 | Howard et al. ................ 382/115 |
| 7,805,379 B1 | 9/2010 | Adkins, III et al. |
| 7,987,262 B2 | 7/2011 | Tung et al. |
| 8,024,578 B2 * | 9/2011 | Geosimonian ................ 713/186 |
| 2001/0001854 A1 | 5/2001 | Schena |
| 2001/0046227 A1 | 11/2001 | Matsuhira et al. |
| 2002/0023132 A1 | 2/2002 | Tornabene et al. |
| 2002/0035611 A1 | 3/2002 | Dooley |
| 2002/0042719 A1 | 4/2002 | Chauchard et al. |
| 2002/0073235 A1 | 6/2002 | Chen et al. |
| 2002/0087643 A1 | 7/2002 | Parsons et al. |
| 2002/0131565 A1 | 9/2002 | Scheuring et al. |
| 2002/0143564 A1 | 10/2002 | Webb et al. |
| 2002/0143664 A1 | 10/2002 | Webb |
| 2002/0147790 A1 | 10/2002 | Snow |
| 2002/0152224 A1 | 10/2002 | Roth et al. |
| 2003/0005287 A1 | 1/2003 | Wray et al. |
| 2003/0069991 A1 | 4/2003 | Brescia |
| 2003/0078894 A1 | 4/2003 | Kon |
| 2003/0078962 A1 | 4/2003 | Fabbricatore et al. |
| 2003/0101278 A1 | 5/2003 | Garcia-Luna-Aceves et al. |
| 2003/0229900 A1 | 12/2003 | Reisman |
| 2004/0039906 A1 | 2/2004 | Oka et al. |
| 2004/0049587 A1 | 3/2004 | Henaff et al. |
| 2004/0073691 A1 | 4/2004 | Sun |
| 2004/0083307 A1 | 4/2004 | Uysal |
| 2004/0148229 A1 | 7/2004 | Maxwell |
| 2004/0162786 A1 | 8/2004 | Cross et al. |
| 2004/0167858 A1 | 8/2004 | Erickson |
| 2004/0169678 A1 | 9/2004 | Oliver |
| 2004/0205200 A1 | 10/2004 | Kotheri et al. |
| 2004/0210386 A1 | 10/2004 | Wood et al. |
| 2004/0210663 A1 | 10/2004 | Phillips et al. |
| 2004/0225569 A1 | 11/2004 | Bunnell |
| 2005/0038658 A1 | 2/2005 | Sladden |
| 2005/0044423 A1 | 2/2005 | Mellmer et al. |
| 2005/0105513 A1 | 5/2005 | Sullivan et al. |
| 2005/0108325 A1 | 5/2005 | Ponte |
| 2005/0114541 A1 | 5/2005 | Ghetie et al. |
| 2005/0134896 A1 | 6/2005 | Koga |
| 2005/0159998 A1 | 7/2005 | Buyukkokten et al. |
| 2005/0216300 A1 | 9/2005 | Appelman et al. |
| 2005/0228881 A1 | 10/2005 | Reasor et al. |
| 2005/0239447 A1 | 10/2005 | Holzman et al. |
| 2005/0267940 A1 | 12/2005 | Galbreath et al. |
| 2006/0031319 A1 | 2/2006 | Nelson et al. |
| 2006/0047725 A1 | 3/2006 | Bramson |
| 2006/0126201 A1 | 6/2006 | Jain |
| 2006/0129635 A1 | 6/2006 | Baccou et al. |
| 2006/0193333 A1 | 8/2006 | Baughan et al. |
| 2006/0198322 A1 | 9/2006 | Hares |
| 2006/0200527 A1 | 9/2006 | Woods |
| 2006/0206547 A1 | 9/2006 | Kulkarni et al. |
| 2006/0230039 A1 | 10/2006 | Shull et al. |
| 2006/0236254 A1 | 10/2006 | Mateescu et al. |
| 2006/0259320 A1 | 11/2006 | LaSalle et al. |
| 2007/0038755 A1 | 2/2007 | Sullivan et al. |
| 2007/0083560 A1 | 4/2007 | Choi et al. |
| 2007/0094411 A1 | 4/2007 | Mullane et al. |
| 2007/0162458 A1 | 7/2007 | Fasciano |
| 2007/0174237 A1 | 7/2007 | Wilbrink et al. |
| 2007/0179863 A1 | 8/2007 | Stoll |
| 2007/0180436 A1 | 8/2007 | Travostino et al. |
| 2007/0198724 A1 | 8/2007 | Hawkinson et al. |
| 2007/0204168 A1 | 8/2007 | Cameron et al. |
| 2007/0214097 A1 | 9/2007 | Parsons et al. |
| 2007/0266034 A1 | 11/2007 | Pousti et al. |
| 2007/0283005 A1 | 12/2007 | Beliles et al. |
| 2007/0291739 A1 | 12/2007 | Sullivan et al. |
| 2008/0005312 A1 | 1/2008 | Boss et al. |
| 2008/0010139 A1 | 1/2008 | Elmer et al. |
| 2008/0019359 A1 | 1/2008 | Droux et al. |
| 2008/0034040 A1 | 2/2008 | Wherry et al. |
| 2008/0040733 A1 | 2/2008 | Pousti et al. |
| 2008/0052384 A1 | 2/2008 | Marl et al. |
| 2008/0059607 A1 | 3/2008 | Schneider |
| 2008/0071883 A1 | 3/2008 | Alterman |
| 2008/0120617 A1 | 5/2008 | Keller et al. |
| 2008/0126232 A1 | 5/2008 | Lee |
| 2008/0133735 A1 | 6/2008 | Thayer et al. |
| 2008/0147659 A1 | 6/2008 | Chen |
| 2008/0182561 A1 * | 7/2008 | Kim et al. .................. 455/414.2 |
| 2008/0201413 A1 | 8/2008 | Sullivan et al. |
| 2008/0228598 A1 | 9/2008 | Leff et al. |
| 2008/0229430 A1 | 9/2008 | Kargman |
| 2008/0250312 A1 | 10/2008 | Curtis |
| 2008/0256553 A1 | 10/2008 | Cullen |
| 2008/0270418 A1 | 10/2008 | Chen et al. |
| 2008/0282338 A1 | 11/2008 | Beer |
| 2008/0287094 A1 | 11/2008 | Keeler et al. |
| 2008/0288300 A1 | 11/2008 | Emling et al. |
| 2008/0288582 A1 | 11/2008 | Pousti et al. |
| 2008/0294479 A1 | 11/2008 | Emling et al. |
| 2008/0294607 A1 | 11/2008 | Partovi et al. |
| 2009/0007229 A1 | 1/2009 | Stokes |
| 2009/0013182 A1 | 1/2009 | Asghari-Kamrani et al. |
| 2009/0016522 A1 | 1/2009 | Torres et al. |
| 2009/0042537 A1 | 2/2009 | Gelbman et al. |
| 2009/0048712 A1 | 2/2009 | Rosenblum |
| 2009/0048904 A1 | 2/2009 | Newton et al. |
| 2009/0055506 A1 | 2/2009 | Hudson et al. |
| 2009/0132487 A1 | 5/2009 | Lev |
| 2009/0150527 A1 | 6/2009 | Tripathi et al. |
| 2009/0157668 A1 | 6/2009 | Newton et al. |
| 2009/0157882 A1 | 6/2009 | Kashyap |
| 2009/0182589 A1 | 7/2009 | Kendall et al. |
| 2009/0248595 A1 | 10/2009 | Lu et al. |
| 2009/0265233 A1 | 10/2009 | Sendo et al. |
| 2009/0272799 A1 | 11/2009 | Skor et al. |
| 2009/0276771 A1 | 11/2009 | Nickolov et al. |
| 2009/0281851 A1 | 11/2009 | Newton et al. |
| 2009/0282144 A1 | 11/2009 | Sherrets et al. |
| 2009/0300407 A1 | 12/2009 | Kamath et al. |
| 2009/0319518 A1 | 12/2009 | Koudas et al. |
| 2010/0027420 A1 | 2/2010 | Smith |
| 2010/0042487 A1 | 2/2010 | Barazani |
| 2010/0057859 A1 | 3/2010 | Shen et al. |
| 2010/0121707 A1 | 5/2010 | Goeldi |
| 2010/0125473 A1 | 5/2010 | Tung et al. |
| 2010/0153848 A1 | 6/2010 | Saha |
| 2010/0169159 A1 | 7/2010 | Rose et al. |
| 2010/0205541 A1 | 8/2010 | Rapaport et al. |
| 2010/0250676 A1 | 9/2010 | Ufford et al. |
| 2010/0306122 A1 | 12/2010 | Shaffer et al. |
| 2010/0306267 A1 | 12/2010 | Zamoff et al. |
| 2010/0306832 A1 | 12/2010 | Mu et al. |
| 2010/0332456 A1 | 12/2010 | Prahlad et al. |

| | | |
|---|---|---|
| 2010/0332818 A1 | 12/2010 | Prahlad |
| 2010/0333116 A1 | 12/2010 | Prahlad et al. |
| 2011/0023101 A1 | 1/2011 | Vernal et al. |
| 2011/0055249 A1 | 3/2011 | Consuegra et al. |
| 2011/0093769 A1 | 4/2011 | Dunn et al. |
| 2012/0114191 A1 | 5/2012 | Bladel et al. |

OTHER PUBLICATIONS

Josang, User Centric Identity Management, 2005.

The OpenID Directory. http://openiddirectory.com/.

The Implications of OpenId. http://video.google.com/videoplay?docid=2288395847791059857.

Dogster, Oct. 27, 2006.

CollectiveX.

Yahoo! Groups Screenshots of http://groups.yahoo.com retrieved from the Internet Archive Wayback Machine dated Jan. 1, 2006.

Zenel, A General Purpose Proxy Filtering Mechanism Applied to the Mobile Environment, Wireless Network, vol. 5, Issue 5, Oct. 1999, pp. 391-409.

Zenel, A General Purpose Proxy Filtering Mechanism Applied to the Mobile Environment, 1997.

Zenel, A Proxy Based Filtering Mechanism for the Mobile Environment, Doctoral Thesis, Columbia University, 1998.

Lowensohn, Domain Pigeon now finds open Twitter Names, Apr. 9, 2009.

Groups in Social Software: Utilizing Tagging to Integrate Individual Contexts for Social Navigation, Master Thesis submitted to the Program of Digital Media, Universitat Bremen (2006).

Matt Mazur, CNET!—Let's see what happens (Domain Pigeon), Apr. 9, 2009.

Huang et al.; Design of Privacy-Preserving Cloud Storage Framework; Grid and Cooperative Computing (GCC), 2010 9th International; Nov. 1-5, 2010; pp. 128-132.

\* cited by examiner

METHODS FOR VERIFYING PERSON'S IDENTITY THROUGH PERSON'S SOCIAL CIRCLE USING PERSON'S PHOTOGRAPH

CROSS REFERENCE TO RELATED PATENT APPLICATIONS

This patent application is related to the following concurrently-filed patent application:

U.S. patent application Ser. No. 13/237,882, "Systems for Verifying Person's Identity through Person's Social Circle Using Person's Photograph."

The subject matter of all patent applications is commonly owned and assigned to Go Daddy Operating Company, LLC. All prior and concurrent applications are incorporated herein in their entirety by reference.

FIELD OF THE INVENTION

The present invention relates in general to person's verification online through person's social circle using person's photographs.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

For Internet users and businesses alike, the Internet continues to be more and more valuable. People are increasingly using the Web for everyday tasks such as social networking, shopping, banking, paying bills, and consuming media and entertainment. E-commerce is growing, with businesses delivering more services and content across the Internet, communicating and collaborating online, and inventing new ways to connect with each other.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER, MOZILLA FIREFOX, or GOOGLE CHROME. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found. Domain names are typically registered for a period of one to ten years with first rights to continually re-register the domain name.

An individual or entity's domain name is increasingly the anchor around which their online presence is maintained. For example, a company's website (www.companyname.com) and email system (john.doe@companyname.com) utilize the company's domain name as an integral part of their architecture. Similarly, many Internet users use their email address, and therefore their domain name, as a means of identification on social websites, which have proliferated in recent years. Social websites are social networking services that focus on building and verifying online social networks for communities of people who share interests and activities, or who are interested in exploring the interests and activities of others, and which necessitates the use of software. Most social websites are Internet based and provide a collection of various ways for users to interact, such as chat, messaging, email, video, voice chat, personal information sharing, image sharing, video sharing, file sharing, status updates, blogging, discussion groups, commentary, etc. The main types of social networking services are those which contain directories of some categories (such as former classmates), means to connect with friends (usually with self-description pages), and/or recommendation systems linked to trust. Popular methods now combine many of these, with FACEBOOK, TWITTER, YOUTUBE, LINKEDIN, MYSPACE, BEBO, PHOTOBUCKET, SNAPFISH, WINDOWS LIVE PHOTOS, WEBSHOTS, and FLICKR being but a few examples.

Such social websites often post their members' public webpages for all Internet users to view, without authentication or login. Conversely, members' private webpages may only be accessed and viewed by the member. The private webpages generally require member authentication and provide the member with tools to manage his public webpage, communicate with other members, and/or otherwise manage his social website membership.

Many social websites, typically those that receive or share sensitive information (as well as websites associated with banks, credit card companies, and online businesses), may require Internet users to login to the website with a secure username and password before accessing the website's content.

The username/password system is a common form of secret authentication data used to control website access. The username/password is kept secret from those not allowed access. Those wishing to gain access are tested on whether or not they have a valid (recognized) username and whether they know the associated password. Internet users are granted or denied access to websites accordingly.

Many social websites have different rules governing the creation of usernames and passwords. Some require passwords that include a complex combination of letters, numbers, and other characters. Others have no restrictions whatsoever. With the proliferation of login-access websites, Internet users often must remember dozens (or more) different username/password combinations, one for each secure website they wish to access. This has resulted in what has come to be known as "password fatigue."

Partly in response to these issues, the concept of the "digital identity" has evolved. A digital identity is a set of characteristics by which a person or thing is recognizable or distinguished in the digital realm. Digital identity allows for the electronic recognition of an individual or thing without confusing it for someone or something else.

There are many applications for an Internet user's digital identity, including authenticating the user before permitting access to a website. One method for such authentication includes the use of a URL. URL-based digital identity systems (such as OPENID) utilize a framework based on the concept that any individual or entity can identify themselves on the Internet with a URL provided by a Digital Identity Provider (e.g., johndoe.openid.com). The Digital Identity Provider maintains an Identity Server on which a Digital Identity Database (a database of provided digital identity URLs and the corresponding authentication passwords) is stored.

Once obtained, the Internet user may utilize their digital identity URL to access various websites. For example, to login to an OpenID-enabled website, the user enters their OpenID (e.g., johndoe.openid.com) in the username box. The user is then momentarily redirected to the user's Digital Identity Provider's website (or an authentication window appears) to login using whatever password they have set up with their Digital Identity Provider. Once authenticated, the Digital Identity Provider sends the participating website an encrypted message (a token) confirming the identity of the person logging in. There are currently numerous Digital Identity Providers offering URL-based (OpenID) digital identity services, meaning they offer digital identity URLs and servers to authenticate them.

One of the problems facing companies doing business online is verifying that digital identity actually belongs to a real human being (person) and that this particular real human being is not impersonating somebody else. Most validation systems today do it by sending an email message to person's email address. The email message typically contains a unique link or code that person should provide back to the verifier (often via a verifier's website). These systems are not able to validate the real identity of a person because the systems only check whether the requester has control over the email account.

Applicant has noticed that presently-existing systems and methods do not allow for efficient and robust matching of digital identities with the actual human persons. For the foregoing reason, there is a need for the systems and methods that would allow for establishing and verifying identity of a human person.

Therefore, new systems and methods are needed to overcome the limitations of the current systems and methods.

DETAILED DESCRIPTION AND PREFERRED EMBODIMENT

Figure 1:
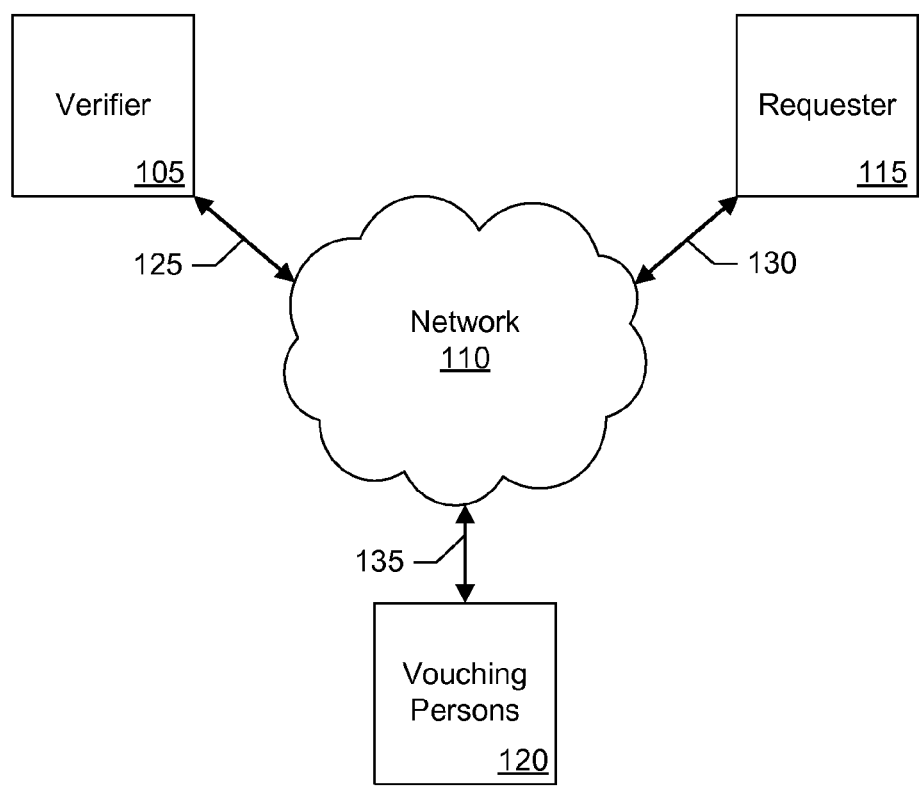
FIG. 1 is a block diagram illustrating high-level components of an embodiment of a system of the present invention.

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

For the purpose of this disclosure the term "Verifier" refers to one or more of the following: a commercial company, a non-profit organization, a governmental agency, a business operator, a business owner, a person, an entity, or a management of an entity. The term "Verifier" also includes a person or entity acting on behalf of the above mentioned parties. Further, the term "Verifier" includes a computer system ran by above mentioned parties.

Figure 5:
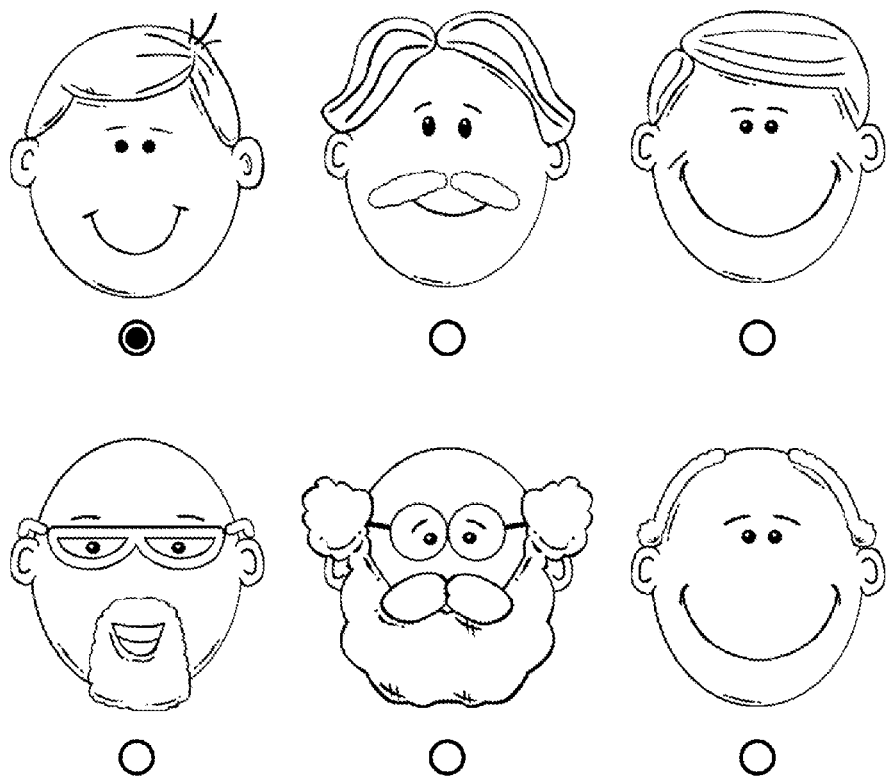
FIG. 5 is a mockup illustrating an embodiment of image lineup of the present invention.

One of the objectives of the present invention is to find a new way to validate a person if he/she is able to supply a photograph of a face of that person. The approach used in the invention for validating identify of the person includes presenting a photograph of the person being verified among photographs of other people in a photo (image) lineup to vouching individuals. A sample embodiment of the image lineup is demonstrated in FIG. 5. The vouching individuals should have a personal knowledge of the person being verified and should select the photograph of the person being verified from the photographs in the image lineup. If vouching individuals select the photograph of the person being verified, it is an indicator that the person being verified is who he is purport to be.

Referring to FIG. 1, an exemplary embodiment of the system of the present invention may include a Verifier 105 connectively coupled to a Network 110 via a first Communication Link 125, a Requester 115 connectively coupled to the Network 110 via a second Communication Link 130, and one or more Vouching Persons 120 (i.e., people/individuals who may have a personal knowledge of the Requester 115) connectively coupled to the Network 110 via a third Communication Link 135. The Verifier 105 is typically a business interested in verifying identity of the Requester 115 using the personal knowledge of the Vouching Persons 120. The Verifier 105 may be a social network website, a financial institution, a background check company, a domain name registrar, a domain name registry, etc. The Requester 115 is one or more network users, who generally need to be verified with the Verifier 105. The Vouching Persons 120 includes for example a friend, an acquaintance, a family member, a coworker of the Requester 115, etc.

The Network 110 is a computer network. It may include a LAN (Local Area Network), WLAN (Wireless Local Area Network), WAN (Wide Area Network), MAN (Metropolitan Area Network), a global network, etc. The Internet is a widely-used global computer network. The Network 110 may support a variety of a network layer protocols, such as, DHCP (Dynamic Host Configuration Protocol), DVMRP (Distance Vector Multicast Routing Protocol), ICMP/ICMPv6 (Internet Control Message Protocol), IGMP (Internet Group Management Protocol), IP (Internet Protocol version 4), IPv6 (Internet Protocol version 6), MARS (Multicast Address Resolution Server), PIM and PIM-SM (Protocol Independent Multicast-Sparse Mode), RIP2 (Routing Information Protocol), RIPng for IPv6 (Routing Information Protocol for IPv6), RSVP (Resource ReSerVation setup Protocol), VRRP (Virtual Router Redundancy Protocol), etc. Further, the Network 110 may support a variety of a transport layer protocols, such as, ISTP (Internet Signaling Transport Protocol), Mobile IP (Mobile IP Protocol), RUDP (Reliable UDP), TALI (Transport Adapter Layer Interface), TCP (Transmission Control Protocol), UDP (User Datagram Protocol), Van Jacobson (compressed TCP), XOT (X.25 over TCP), etc. In addition, the Network 110 may support a variety of an application layer protocols, such as, COPS (Common Open Policy Service), FANP (Flow Attribute Notification Protocol), Finger (User Information Protocol), FTP (File Transfer Protocol), HTTP (Hypertext Transfer Protocol), IMAP and IMAP4 (Internet Message Access Protocol, rev 4), IMPPpre (Instant Messaging Presence Protocol), IMPPmes (Instant Messaging Protocol), IPDC (IP Device Control), IRC (Internet Relay Chat Protocol), ISAKMP (Internet Message Access Protocol version 4rev1), ISP, NTP (Network Time Protocol), POP and POP3 (Post Office Protocol, version 3), Radius (Remote Authentication Dial In User Service), RLOGIN (Remote Login), RTSP (Real-time Streaming Protocol), SCTP (Stream Control Transmission Protocol), S-HTTP or HTTPS (Secure Hypertext Transfer Protocol), SLP (Service Location Protocol), SMTP (Simple Mail Transfer Protocol), SNMP (Simple Network Management Protocol), SOCKS (Socket Secure Server), TACACS+ (Terminal Access Controller Access Control System), TELNET (TCP/IP Terminal Emulation Protocol), TFTP (Trivial File Transfer Protocol), WCCP (Web Cache Coordination Protocol), X-Window (X Window), etc. The Network 110 supports digital interactions between the Verifier 105, the Requester 115, and the Vouching Persons 120.

Figure 2:
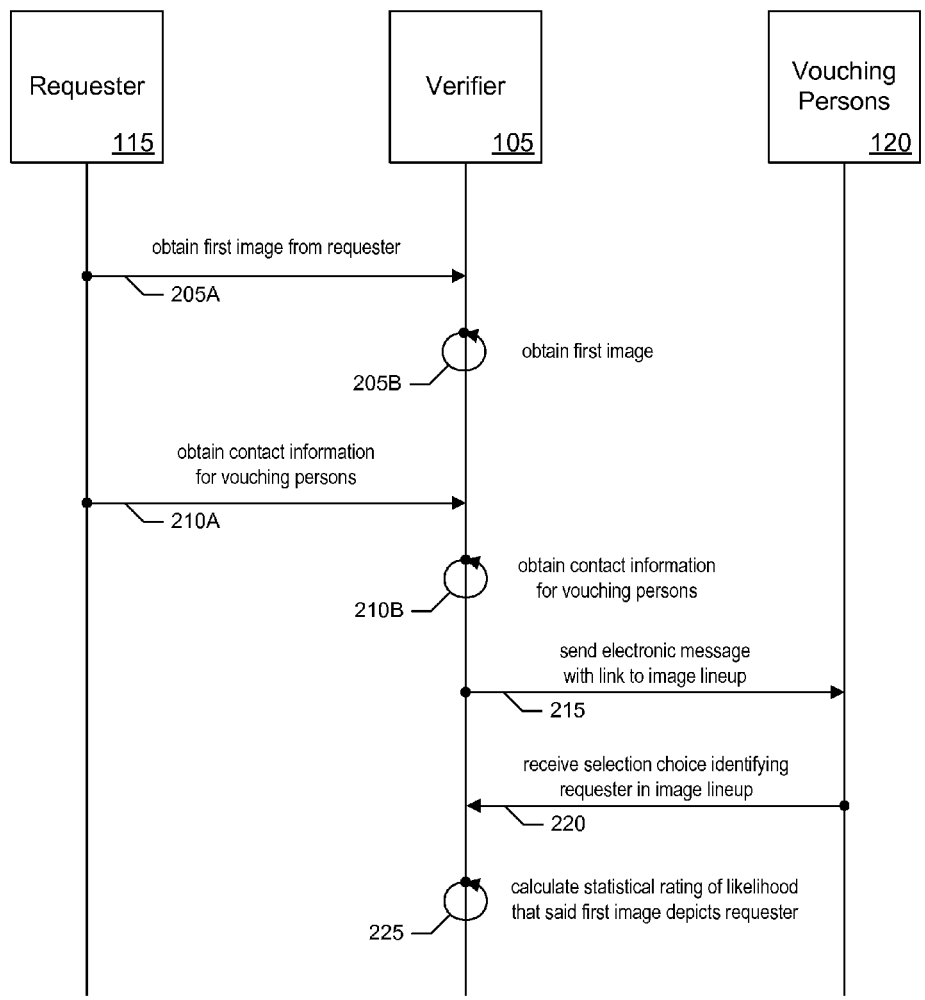
FIG. 2 is an interaction diagram illustrating interactions between the high-level components of a system of the present invention.

An exemplary embodiment of interactions between the system components is shown in FIG. 2. The Verifier 105 obtains a first image. Presumably the first image at least depicts the face of the Requester 115. The first image can be obtained from the Requester 115 (step 205A) or from other sources (step 205B). In a preferred embodiment the Verifier 105 obtains the first image from the Requester 115 via a web-based graphical user interface. The Verifier 105 obtains contact information for vouching persons. The contact information can be obtained from the Requester 115 (step 210A) or from other sources (step 210B). The Verifier 105 sends an electronic message to the Vouching Persons 120 with a link to an image lineup (step 215). The image lineup contains the first image obtained from the Requester 115 and images of other people. The Vouching Persons 120 select the image depicting the Requester 115 and the Verifier 105 receives Vouching Persons 120 selection choice identifying whether the first image (obtained from the Requester 115 or other sources) in the image lineup depicts the Requester 115 (step 220). The Verifier 105 then calculates a statistical rating of a likelihood that the first image obtained from the Requester 115 depicts the Requester 115 by using the selection choice received from the Vouching Persons 120 (step 225). The value of statistical rating indicates whether the Requester 115 was successfully authenticated or verified.

If obtaining the first image from the Requester 115 is enabled via a web-based graphical user interface, the web-based graphical user interface is typically a website or a webpage. The web-based graphical user interface is achieved by a first computer-readable code on a server computer of the Verifier 105 and by a second computer-readable code on a desktop/remote computer of the Requester 115. The first computer-readable code may comprise, for example, SGML, HTML, DHTML, XML, XHTML, CSS, server-side programming languages and scripts, such as, Perl, PHP, ASP, ASP.NET, Java, JavaScript, Visual J++, J#, C, C++, C#, Visual Basic, VB.Net, VBScript, server-side databases, etc. The second computer-readable code may comprise, for example, SGML (Standard Generalized Markup Language), HTML (HyperText Markup Language), DHTML (Dynamic HTML), XML (eXtensible Markup Language), XHTML (eXtensible HTML), CSS (Cascading Style Sheet), client-side programming scripts, such as, JavaScript and VBScript, client-side databases, etc. Both the first computer-readable code and the second computer-readable code can support embedded objects, such as, audio and video elements, ActiveX controls, etc. Alternatively, collection of personal information from the Requester 115 may be enabled via other means, e.g., a desktop software or an application on a mobile device.

The server computer of the Verifier 105 can be running a variety of operating systems, such as, MICROSOFT WINDOWS, APPLE MAC OS X, UNIX, LINUX, GNU, BSD, FreeBSD, SUN SOLARIS, NOVELL NETWARE, OS/2, TPF, eCS (eComStation), VMS, Digital VMS, OpenVMS, AIX, z/OS, HP-UX, OS-400, etc. The web-based graphical user interface may be provided by a web-server software running on the server computer of the Verifier 105. The web-server software may include MICROSOFT IIS (Internet Information Services/Server), APACHE HTTP SERVER, APACHE TOMCAT, nginx, GWS (GOOGLE WEB SERVER), SUN JAVA SYSTEM WEB SERVER, etc.

The Verifier 105 computer systems can contain one or more physical servers. The physical servers can play different roles in the system of the invention, e.g., a Web Server, a Mail Server, an Application Server, a Database Server, a DNS (Domain Name System) Server, etc. The Verifier 105 computer systems can be based on a variety of hardware platforms, such as, x86, x64, INTEL, ITANIUM, IA64, AMD, SUN SPARC, IBM, HP, etc.

The Requester 115 computer systems and the Vouching Persons 120 computer systems are electronic devices suitable for interaction over the Network 110. The Requester 115 computer systems and the Vouching Persons 120 computer systems may contain, for example, a personal computer, a desktop computer, a laptop computer, a notebook computer, a tablet computer, a cell phone, a smart phone, a PDA, a palm-top computer, a handheld computer, a pocket computer, a touch screen device, an IBM PC-compatible electronic device, an APPLE MAC-compatible electronic device, a computing device, a digital device, or another electronic device or combination thereof.

The Verifier 105, the Requester 115, and the Vouching Persons 120 are communicatively connected to the Network 110 via the Communication Links 125, 130, and 135. The Communication Links 125, 130, and 135 are wired or wireless connections suitable for exchange of digital information. The Communication Links 125, 130, and 135 may include telephone line, copper twisted pair, power-line, fiber-optic, cellular, satellite, dial-up, Ethernet, DSL, ISDN, T-1, DS-1, Wi-Fi, etc.

The Verifier 105 computer systems may be located in a physical datacenter, in a virtual datacenter, in a variety of countries or territories, on a floating device, be connected to the Internet backbone, be connected to a power grid, etc. The floating device may be a marine or naval vessel or ship. Verifier 105 computer systems may be cooled by air or liquid, such as water, including ocean or sea water.

Figure 3:
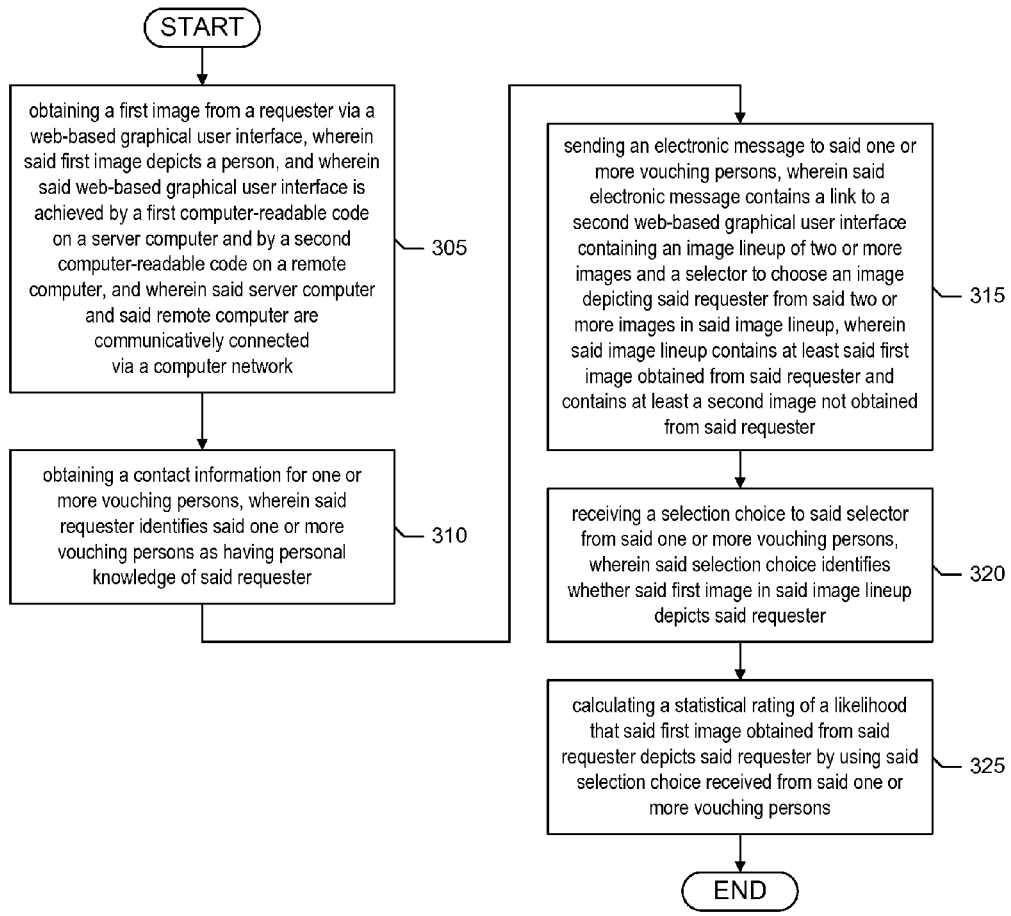
FIG. 3 is a flowchart illustrating an embodiment of method of the present invention.

An exemplary embodiment of a method of present invention is shown in FIG. 3. The method comprises the steps of: obtaining a first image from a requester via a web-based graphical user interface, wherein the first image depicts a person, and wherein the web-based graphical user interface is achieved by a first computer-readable code on a server computer and by a second computer-readable code on a remote computer, and wherein the server computer and the remote computer are communicatively connected via a computer network (step 305), obtaining a contact information for one or more vouching persons, wherein the requester identifies one or more vouching persons as having personal knowledge of the requester (step 310), sending an electronic message to one or more vouching persons, wherein the electronic message contains a link to a second web-based graphical user interface containing an image lineup of two or more images and a selector to choose an image depicting the requester from the two or more images in the image lineup, wherein the image lineup contains at least the first image obtained from the requester and contains at least a second image not obtained from the requester (step 315), receiving a selection choice to the selector from one or more vouching persons, wherein the selection choice identifies whether the first image in the image lineup depicts the requester (step 320), and calculating a statistical rating of a likelihood that the first image obtained from the requester depicts the requester by using the selection choice received from one or more vouching persons (step 325).

The web-based graphical user interface may include a website, a webpage, a desktop software application, a mobile device application, and others.

The computer network may be the Internet.

Obtaining the first image from the requester may be performed in a variety of ways. For example, the requester can scan a picture of himself/herself from a hard copy on a scanner, scan the identification document on a scanner and isolate the picture, take a digital picture of himself/herself with a digital camera, take a digital picture of the identification document with a digital camera, take a digital picture of himself/herself with a mobile device equipped with a built-in camera, take a digital picture of the identification document with a mobile device equipped with a built-in camera, etc. A mobile device may be a smart phone, such as IPHONE, BLACKBERRY, DROID/ANDROID, HTC, PALM, etc. The requester may email the digital copy (scan/digital picture) of the identification document to the verifier, upload it on a website, or use an application on a mobile device to transmit the digital copy to the verifier.

The identification document may include a government issued identification document, driver's license, passport, state or province identification card, corporate identification card, and variety of other documents issued to the requester and containing requester's photograph.

In an alternative embodiment, the first image may be obtained from a computer network information source. The computer network information sources may include a website, a webpage, an online blog, a social network website, an image sharing website, and a variety of other digital sources. Among such computer network information sources may be mentioned FACEBOOK, TWITTER, YOUTUBE, LINKEDIN, MYSPACE, BEBO, PHOTOBUCKET, SNAPFISH, WINDOWS LIVE PHOTOS, WEBSHOTS, FLICKR, etc. Many users upload pictures of themselves or other users to these websites. In other embodiments, the first image may be obtained from a trusted partner, a photographer, a point-of-sale, a photo booth, a kiosk used to photograph and/or verify requesters, etc.

The methods of the present invention may utilize a variety of mechanisms to select the images from the computer network information sources. For example, images posted onto the computer network information sources from an account of the requester, or images tagged with a name of the requester, or images appearing in a social network account of the requester may be selected. A variety of other mechanisms may be utilized that select the images with some probability that a facial depiction of the requester is appearing in the image.

The contact information for one or more vouching persons may include a name for one or more vouching persons, an electronic mail address, a telephone number, a fax number, a mailing address, a home address, etc.

In one embodiment the requester provides the contact information for one or more vouching persons, thus the contact information is obtained from the requester. In another embodiment the contact information for one or more vouching persons may be obtained from a requester's electronic contact book (phonebook, address book), a requester's electronic mail account, or a variety of online sources, etc. E.g., requester's connections (friends) on a social network website may be used to collect contact information for vouching persons. In yet another embodiment, the contact information for vouching persons may be obtained from public or private records, e.g., public records databases for requester's relatives, employer databases for requester's coworkers, etc.

In one embodiment, the requester may indicate that one or more vouching persons are having a personal knowledge of the requester. In another embodiment, the vouching persons' personal knowledge of the requester may be implied, assumed, or inferred from various sources (websites, databases).

An electronic message may be sent to one or more vouching persons. The electronic message may include an electronic mail message, a telephone text message, a facsimile, etc. The electronic message may contain a link to the second web-based graphical user interface. The link may be active (hypertext-enabled) or inactive URL. The second web-based graphical user interface may contain an image lineup of two or more images and a selector to choose an image depicting the requester from the two or more images in the image lineup. The image lineup includes at least the first image obtained from the requester and at least one other image not obtained from the requester. The vouching person will have the option of selecting the requester's photograph/image from the lineup. A sample embodiment of the image lineup is demonstrated in FIG. 5. The selector may be implemented as a button, a radio button, a drop-down list, etc.

The second web-based graphical user interface may include a website, a webpage, a desktop software application, a mobile device application, and others.

The statistical rating of a likelihood that the first image obtained from the requester actually depicts the requester may be calculated in various ranges. It may be a range of real numbers from 0 to 1, where value 0 indicates the lowest likelihood and value 1 indicates the highest likelihood that the first image obtained from the requester actually depicts the requester. For example, if 4 out of 5 vouching persons (80%) indicated that the first image depicts the requester, the statistical rating may be assigned value of 0.8. Alternatively, trustworthiness of the vouching person may be used to calculate the statistical rating (e.g., weighted average). If a particular vouching person had a history of misidentifying requesters, the effect on the statistical rating calculations by this particular vouching person the maybe lowered or completely eliminated.

In one embodiment, the statistical rating of value 0.5 and above indicates that the first image obtained from the requester actually depicts the requester. In another embodiment, the statistical rating is calculated as an integer number of 0 or 1.

Further personal information may be collected from the requester. The personal information may include name, mailing address, home address, electronic mail address, telephone number, date of birth of the requester, login name to a website (e.g., social network or image sharing website), an account number or an account name of the requester to a website (e.g., social network or image sharing website), a password of the requester to a website (e.g., social network or image sharing website), and a variety of other information that may be associated with the requester.

Figure 4:
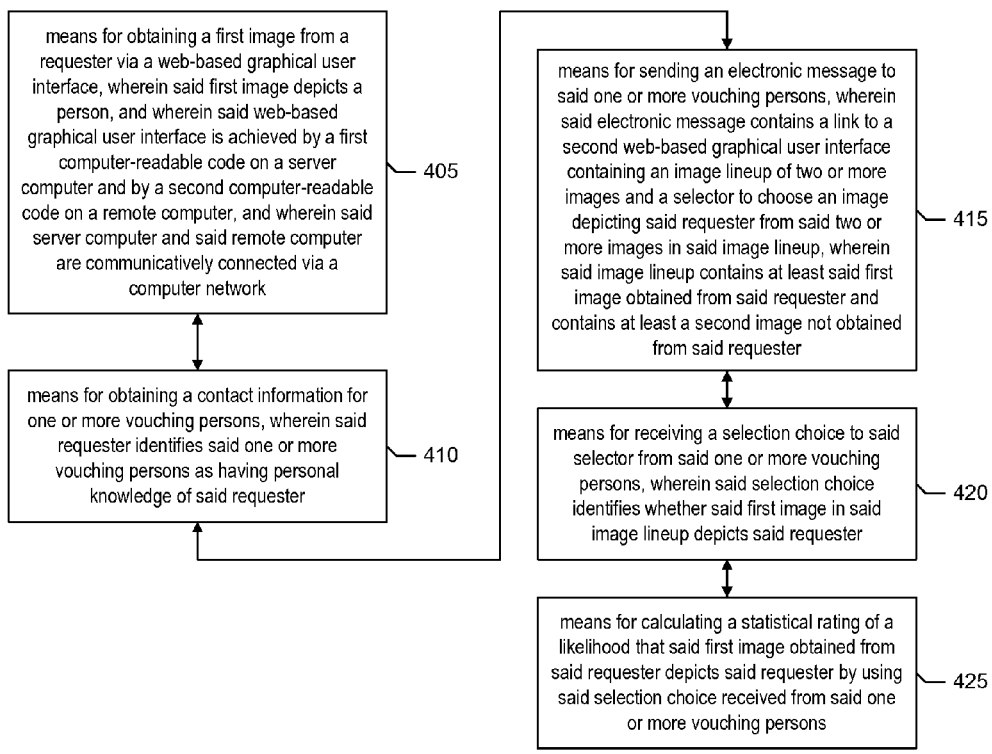
FIG. 4 is a block diagram illustrating an embodiment of means-plus-function system of the present invention.

Referring to FIG. 4, an exemplary embodiment of the system of the present invention may include: means for obtaining a first image from a requester via a web-based graphical user interface, wherein the first image depicts a person, and wherein the web-based graphical user interface is achieved by a first computer-readable code on a server computer and by a second computer-readable code on a remote computer, and wherein the server computer and the remote computer are communicatively connected via a computer network (405), means for obtaining a contact information for one or more vouching persons, wherein the requester identifies one or more vouching persons as having personal knowledge of the requester (410), means for sending an electronic message to one or more vouching persons, wherein the electronic message contains a link to a second web-based graphical user interface containing an image lineup of two or more images and a selector to choose an image depicting the requester from the two or more images in the image lineup, wherein the image lineup contains at least the first image obtained from the requester and contains at least a second image not obtained from the requester (415), means for receiving a selection choice to the selector from one or more vouching persons, wherein the selection choice identifies whether the first image in the image lineup depicts the requester (420), and means for calculating a statistical rating of a likelihood that the first image obtained from the requester depicts the requester by using the selection choice received from one or more vouching persons (425).

The means for obtaining the first image from the requester may include one or more devices configured to obtain the first image from the requester. The means for obtaining the contact information for one or more vouching persons may include one or more devices configured to obtain the contact information for one or more vouching persons. The means for sending may include one or more devices configured to send electronic messages to vouching persons. The means for receiving a selection choice to the selector from one or more vouching persons may include one or more devices configured to receive a selection choice to the selector from the vouching persons. The means for calculating may include one or more devices The web-based graphical user interface may include a website, a webpage, a desktop software application, a mobile device application, and others.

The computer network may be the Internet.

The means for obtaining the first image from the requester may be implemented in a variety of embodiments. For example, the requester can scan a picture of himself/herself from a hard copy on a scanner, scan the identification document on a scanner and isolate the picture, take a digital picture of himself/herself with a digital camera, take a digital picture of the identification document with a digital camera, take a digital picture of himself/herself with a mobile device equipped with a built-in camera, take a digital picture of the identification document with a mobile device equipped with a built-in camera, etc. A mobile device may be a smart phone, such as IPHONE, BLACKBERRY, DROID/ANDROID, HTC, PALM, etc. The requester may email the digital copy (scan/digital picture) of the identification document to the verifier, upload it on a website, or use an application on a mobile device to transmit the digital copy to the verifier.

The identification document may include a government issued identification document, driver's license, passport, state or province identification card, corporate identification card, and variety of other documents issued to the requester and containing requester's photograph.

In an alternative embodiment, the means for obtaining may obtain the first image from a computer network information source. The computer network information sources may include a website, a webpage, an online blog, a social network website, an image sharing website, and a variety of other digital sources. Among such computer network information sources may be mentioned FACEBOOK, TWITTER, YOU-TUBE, LINKEDIN, MYSPACE, BEBO, PHOTOBUCKET, SNAPFISH, WINDOWS LIVE PHOTOS, WEBSHOTS, FLICKR, etc. Many users upload pictures of themselves or other users to these websites. In other embodiments, the means for obtaining may obtain the first image from a trusted partner, a photographer, a point-of-sale, a photo booth, a kiosk used to photograph and/or verify requesters, etc.

The systems of the present invention may utilize a variety of mechanisms to select the images from the computer network information sources. For example, images posted onto the computer network information sources from an account of the requester, or images tagged with a name of the requester, or images appearing in a social network account of the requester may be selected. A variety of other mechanisms may be utilized that select the images with some probability that a facial depiction of the requester is appearing in the image.

The contact information for one or more vouching persons may include a name for one or more vouching persons, an electronic mail address, a telephone number, a fax number, a mailing address, a home address, etc.

In one embodiment the contact information for one or more vouching persons is provided by the requester, thus the means for obtaining contact information obtain such contact information from the requester. In another embodiment the contact information for one or more vouching persons is obtained from a requester's electronic contact book (phonebook, address book), a requester's electronic mail account, or a variety of online sources, etc. E.g., requester's connections (friends) on a social network website may be used to collect contact information for vouching persons. In yet another embodiment, the contact information for one or more vouching persons is obtained from public or private records, e.g., public records databases for requester's relatives, employer databases for requester's coworkers, etc.

In one embodiment, the requester may indicate that one or more vouching persons are having a personal knowledge of the requester. In another embodiment, the vouching persons' personal knowledge of the requester may be implied, assumed, or inferred from various sources (websites, databases).

The electronic message sent by the means for sending to one or more vouching persons may include an electronic mail message, a telephone text message, a facsimile, etc. The electronic message may contain a link to the second web-based graphical user interface. The link may be active (hypertext-enabled) or inactive URL. The second web-based graphical user interface may contain an image lineup of two or more images and a selector to choose an image depicting the requester from the two or more images in the image lineup. The image lineup includes at least the first image obtained from the requester and at least one other image not obtained from the requester. The vouching person will have the option of selecting the requester's photograph/image from the lineup. A sample embodiment of the image lineup is demonstrated in FIG. 5. The selector may be implemented as a button, a radio button, a drop-down list, etc.

The second web-based graphical user interface may include a website, a webpage, a desktop software application, a mobile device application, and others.

The statistical rating of a likelihood that the first image obtained from the requester actually depicts the requester may be calculated by the means for calculating in various ranges. It may be a range of real numbers from 0 to 1, where value 0 indicates the lowest likelihood and value 1 indicates the highest likelihood that the first image obtained from the requester actually depicts the requester. For example, if 4 out of 5 vouching persons (80%) indicated that the first image depicts the requester, the statistical rating may be assigned value of 0.8. Alternatively, trustworthiness of the vouching person may be used to calculate the statistical rating (e.g., weighted average). If a particular vouching person had a history of misidentifying requesters, the effect on the statistical rating calculations by this particular vouching person the maybe lowered or completely eliminated.

In one embodiment, the statistical rating of value 0.5 and above indicates that the first image obtained from the requester actually depicts the requester. In another embodiment, the statistical rating is calculated as an integer number of 0 or 1.

Further the system may include a means for collecting personal information from the requester. The personal information may include name, mailing address, home address, electronic mail address, telephone number, date of birth of the requester, login name to a website (e.g., social network or image sharing website), an account number or an account name of the requester to a website (e.g., social network or image sharing website), a password of the requester to a website (e.g., social network or image sharing website), and a variety of other information that may be associated with the requester.

The means of the embodiments disclosed in the present specification can be substituted with machines, apparatuses, and devices described or listed in this specification or equivalents thereof. As a non-limiting example, the means of the embodiments may be substituted with a computing device, a computer-readable code, a computer-executable code, or any combination thereof.

U.S. patent application Ser. No. 12/939,917 entitled "Methods for Person's Verification Using Photographs on Identification Documents" filed on Nov. 4, 2010 is hereby incorporated in its entirety by reference.

U.S. patent application Ser. No. 12/939,925 entitled "Systems for Person's Verification Using Photographs on Identification Documents" filed on Nov. 4, 2010 is hereby incorporated in its entirety by reference.

U.S. patent application Ser. No. 13/018,599 entitled "Systems and Methods for Person's Verification Using Photographs on Identification Documents Taken by a Verifier-Controlled Mobile Device" filed on Feb. 1, 2011 is hereby incorporated in its entirety by reference.

U.S. patent application Ser. No. 13/018,602 entitled "Systems and Methods for Person's Verification Using Photographs on Identification Documents Taken by a Verifier-Controlled Digital Camera" filed on Feb. 1, 2011 is hereby incorporated in its entirety by reference.

U.S. patent application Ser. No. 13/018,607 entitled "Systems and Methods for Person's Verification Using Scans of Identification Documents Produced by a Verifier-Controlled Scanning Device" filed on Feb. 1, 2011 is hereby incorporated in its entirety by reference.

U.S. patent application Ser. No. 13/018,612 entitled "Systems and Methods for Person's Verification Using Portrait Photographs Taken by a Verifier-Controlled Mobile Device" filed on Feb. 1, 2011 is hereby incorporated in its entirety by reference.

U.S. patent application Ser. No. 13/018,616 entitled "Systems and Methods for Person's Verification Using Portrait Photographs Taken by a Verifier-Controlled Digital Camera" filed on Feb. 1, 2011 is hereby incorporated in its entirety by reference.

All embodiments of the present invention may further be limited and implemented with any and all limitations disclosed in this specification or in the documents incorporated in this patent application by reference.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

The invention claimed is:

1. A method, comprising the steps of:
a) obtaining a first image from a requester via a web-based graphical user interface, wherein said first image depicts a person, and wherein said web-based graphical user interface is achieved by a first computer-readable code on a server computer and by a second computer-readable code on a remote computer, and wherein said server computer and said remote computer are communicatively connected via a computer network,
b) obtaining a contact information for one or more vouching persons, wherein said requester identifies said one or more vouching persons as having personal knowledge of said requester,
c) sending an electronic message to said one or more vouching persons, wherein said electronic message contains a link to a second web-based graphical user interface containing an image lineup of two or more images and a selector to choose an image depicting said requester from said two or more images in said image lineup, wherein said image lineup contains at least said first image obtained from said requester and contains at least a second image not obtained from said requester,
d) receiving a selection choice to said selector from said one or more vouching persons, wherein said selection choice identifies whether said first image in said image lineup depicts said requester, and
e) calculating a statistical rating of a likelihood that said first image obtained from said requester depicts said requester by using said selection choice received from said one or more vouching persons.

2. The method of claim 1, wherein said computer network contains the Internet.

3. The method of claim 1, wherein said first image is located on a government issued identification document.

4. The method of claim 1, wherein said first image is located on a driver's license.

5. The method of claim 1, wherein said first image is located on a passport.

6. The method of claim 1, wherein said first image is located on a state identification card.

7. The method of claim 1, wherein said web-based graphical user interface comprises a website.

8. The method of claim 1, wherein said web-based graphical user interface comprises a webpage.

9. The method of claim 1, wherein said web-based graphical user interface comprises a desktop software application.

10. The method of claim 1, wherein said web-based graphical user interface comprises a mobile device application.

11. The method of claim 1, wherein said contact information for one or more vouching persons contains a name for one or more vouching persons.

12. The method of claim 1, wherein said contact information for one or more vouching persons contains an electronic mail address for one or more vouching persons.

13. The method of claim 1, wherein said contact information for one or more vouching persons contains a telephone number for one or more vouching persons.

14. The method of claim 1, wherein said contact information for one or more vouching persons contains a mailing address for one or more vouching persons.

15. The method of claim 1, wherein said contact information for one or more vouching persons contains a home address for one or more vouching persons.

16. The method of claim 1, wherein said contact information for one or more vouching persons is obtained from said requester.

17. The method of claim 1, wherein said contact information for one or more vouching persons is obtained from a social network website.

18. The method of claim 1, wherein said contact information for one or more vouching persons is obtained from an electronic address book of said requester.

19. The method of claim 1, wherein said contact information for one or more vouching persons is obtained from an electronic mail account of said requester.

20. The method of claim 1, wherein said sending said electronic message to said one or more vouching persons comprises sending a telephone text message.

21. The method of claim 1, wherein said sending said electronic message to said one or more vouching persons comprises sending an electronic mail message.

22. The method of claim 1, wherein said second web-based graphical user interface comprises a website.

23. The method of claim 1, wherein said second web-based graphical user interface comprises a webpage.

24. The method of claim 1, wherein said second web-based graphical user interface comprises a desktop software application.

25. The method of claim 1, wherein said second web-based graphical user interface comprises a mobile device application.

26. The method of claim 1, wherein said statistical rating is calculated as a real number in a range from 0 to 1, wherein value 0 indicates the lowest likelihood and value 1 indicates the highest likelihood that said first image depicts said requester.

27. The method of claim 26, wherein said statistical rating of value 0.5 and above indicates that said first image depicts said requester.

28. The method of claim 1, wherein said statistical rating is calculated as an integer number of 0 or 1.

* * * * *